April 19, 1932.  W. A. HERINGTON  1,854,696
FISH LURE
Filed May 21, 1931
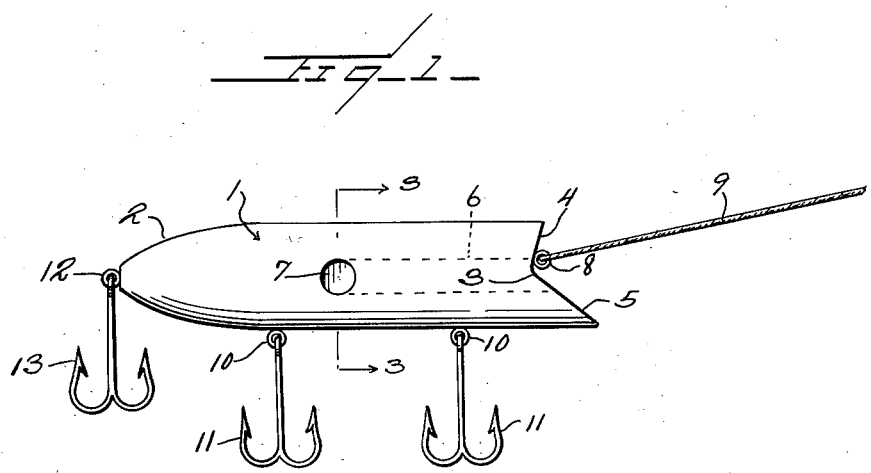
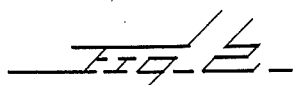
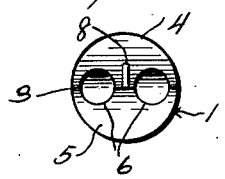
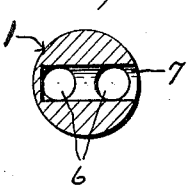
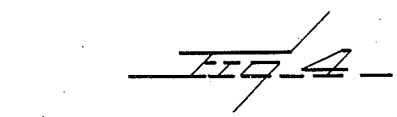
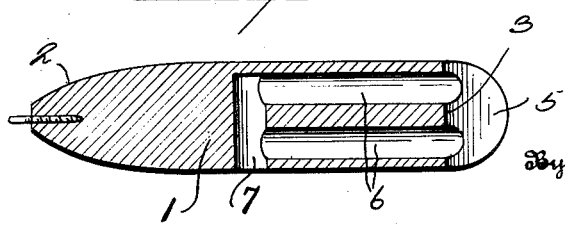
Inventor
W. A. Herington
By Watson E. Coleman
Attorney Patented Apr. 19, 1932

1,854,696

UNITED STATES PATENT OFFICE

WILLIAM A. HERINGTON, OF TRENTON, MISSOURI

FISH LURE

Application filed May 21, 1931. Serial No. 539,098.

This invention relates to improvements in artificial fishing baits or lures.

The primary object of the present invention is to provide a plug type of artificial bait of a novel design which will perform erratic movements in water when drawn therethrough, thus simulating the darting action of a small fish or minnow.

Another object of the invention is to provide an artificial fishing bait which is of simple design and which may be inexpensively manufactured and sold.

The invention broadly contemplates the provision of an elongated body of cylindrical cross section having a mouth formed transversely of the forward end thereof and having a water tube or passage formed longitudinally therein from the mouth and opening through the side of the body at a point intermediate the ends thereof. When the body is drawn longitudinally through the water, the water will enter the open forward end of the passageway and pass out through the side of the body thus making the body swing over to one side, and at one point in this swinging movement it will hesitate or stop and then suddenly straighten out, thus acting as though it were darting back and forth in the water.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the lure embodying the present invention;

Figure 2 is a view in front elevation of the same;

Figure 3 is a view in cross section taken on the line 3—3 of Figure 1;

Figure 4 is a horizontal longitudinal sectional view of the lure.

Referring now more particularly to the drawings wherein like numerals of reference indicate corresponding parts throughout the several views, the numeral 1 indicates generally the body of the present bait or lure. This body is preferably of cylindrical cross sectional design and the rear end is tapered off as indicated at 2 while the forward end has a mouth 3 formed transversely thereacross which thus forms upper and lower surfaces or faces 4 and 5 respectively.

The upper face of the mouth 3 is relatively short as it extends upwardly at a sharp angle, whereas the lower face 5 is relatively long and extends forwardly and downwardly on a flat angle with respect to the longitudinal center or axis of the body.

Formed longitudinally in the body in spaced parallel relation and in a plane disposed parallel with the transverse central line on which the faces 4 and 5 join, is a pair of passages or tubes 6 which, at a point substantially midway between the ends of the body, open into a passage 7 which is formed transversely in the body from one side thereof as shown in Figure 3. At a point adjacent the lower part of the upper mouth surface 4 there is secured an eye 8 to which a line 9 may be attached and similar eyes 10 are secured in the body on the longitudinal center thereof, for the attachment thereto of hooks 11. The reduced rear end of the body 2 also has an eye 12 attached thereto to which a hook 13 may be connected.

From the foregoing it will be seen that as the hooks 11 are secured to the body beneath the plane occupied by the passages 6 and on a line disposed in a plane between these passages, they will act to assist in retaining the body in proper position as it is drawn through the water.

As the lure is drawn through the water by a line attached to the eye 8, the water will be forced to flow through the passages 6 and out through the side of the body, through the passage 7. This gives an erratic motion to the bait characterized by a hesitating action after the bait has swung to one side of the course which it is traveling, followed by a sudden darting as it returns to a position parallel with its course.

The hesitation of the bait is obtained when the same reaches an angle or position in the water where the resistance in the holes becomes equal, thereby causing a temporary hesitation of the action of the bait. A side swiping motion follows the hesitation, as there is a concentrated force of water coming out through the hole in the body of the bait, causing it to be forced rapidly to one side.

Having thus described the invention, what is claimed is:—

1. A fishing lure comprising an elongated hook carrying body having a water passage formed therein, a portion of the passage extending longitudinally of the body parallel to the longitudinal axis and opening through the forward end of the body to receive water as the body is drawn therethrough and the remainder of the passage extending transversely of the body and opening through one side, the flow of water through the passage causing the body to move erratically.

2. A fishing lure comprising an elongated body having a mouth formed transversely of one end, means for attaching a line to the mouth end of the body, and passages formed longitudinally through the body from an opening at one end into the mouth and merging with a transverse passage at a point intermediate the ends of the body, said transverse passage being open at one end only, said body being caused to move erratically in its travel through the water, by the flow of water through said passages.

3. A fishing lure compriisng an elongated cylindrical body having a mouth formed transversely of one end, said mouth having forwardly inclined upper and lower surfaces, said lower surface being of greater length than the upper surface, a pair of passages formed longitudinally in the body and disposed in side by side relation in a plane parallel with the angle formed at the point of joinder between the surfaces of said mouth, and a passage formed transversely through the body at a point substantially midway between its ends and connecting across the rear ends of the first passage, said transverse passage being open at one end only, and means for attaching a line to the mouth end of the body.

4. A fishing lure comprising an elongated cylindrical body having a mouth formed transversely of one end, said mouth having forwardly inclined upper and lower surfaces, said lower surface being of greater length than the upper surface, a pair of passages formed longitudinally in the body and disposed in side by side relation in a plane parallel with the angle formed at the point of joinder between the surfaces of said mouth, and a passage formed transversely through the body at a point substantially midway between its ends and connecting across the rear ends of the first passage, said transverse passage being open at one end only, and an eye for attaching a line to the body, secured at the lower part of the vertical center of the upper surface of the mouth.

In testimony whereof I hereunto affix my signature.

WILLIAM A. HERINGTON.